United States Patent [19]

Meyer et al.

[11] 4,017,869

[45] Apr. 12, 1977

[54] INK RECORDER FOR THE JET-INK-PROCESS

[75] Inventors: Rudolf Meyer; Klaus Hoffmann, both of Leverkusen, Germany

[73] Assignee: AGFA-Gevaert, A.G., Leverkusen, Germany

[22] Filed: July 8, 1975

[21] Appl. No.: 594,110

[30] Foreign Application Priority Data

July 13, 1974 Germany .......................... 2433719

[52] U.S. Cl. .............................. 346/75; 346/140 R

[51] Int. Cl.[2] ........................................ G01D 15/18

[58] Field of Search ...................... 346/75, 140, 46; 358/75

[56] References Cited

UNITED STATES PATENTS 2,573,143 10/1951 Jacob ................................. 358/75

3,134,849 5/1964 Frohbach et al. ................... 358/75

3,416,153 12/1968 Hertz et al. .......................... 346/75

*Primary Examiner*—Joseph W. Hartary

*Attorney, Agent, or Firm*—Connolly and Hutz

[57] ABSTRACT

An ink jet device for recording colored images comprises a plurality of nozzles for producing differently colored ink jets which are directed on to a common point in the plane of a recording support; a control electrode, an extraction system for removing the ink deflected and hence not used for recording and an aperture diaphragm being associated with each of the nozzles; the control electrodes, extraction systems and diaphragms being combined into a block; the control electrodes being electrically insulated with respect to each other and with respect to earth and the nozzles being at electrical earth potential.

7 Claims, 3 Drawing Figures

INK RECORDER FOR THE JET-INK-PROCESS

This invention relates to an ink recorder for use in an ink-jet recording process, by means of which individual colour components of a coloured image point are simultaneously applied to a recording support in the form of differently coloured ink jets.

In the reproduction of colour pictures with electrically controlled ink jets (ink jet recording), the original is optically scanned by an arangement in which the light of a certain region of the spectrum (for example red, green and blue) reflected or transmitted by an image element of the original is converted into an electrical signal in an electro-optical transducer. After amplification and suitable conversion, this signal is used to control an associated spray head of a recorder, as described for example in German Auslegeschrift No. 1,271,754.

In such a spray head, the ink issues through a nozzle at high speed, after leaving the nozzle opening, breaks up into individual droplets which receive an electrical charge by electrostatic induction. By virtue of their charge, the trajectory of these droplets can be influenced by electrical signals, so that the force of a steam of droplets passing through a predetermined opening in a diaphragm can be electrically controlled.

The trajectory of the droplets is determined by the velocity of the droplets as they issue from the nozzle and by electrical forces which subsequently act upon the droplets. The ink is projected from the nozzle on to the recording support either by being forced through the nozzle under pressure or by extraction from a capillary under the effect of electrical forces.

In order to transmit image information from the original to the recording support a separate scanning unit, consisting of a light source, lens, separation filter and detector, is generally used for each primary color (for example cyan, magenta and yellow), and a spray head is associated with each scanning unit for reproduction purposes. The color components of the various primary color of an image element are successively sensed during the relative scanning movement between the original and the scanning unit. In the reproduction part of the apparatus, the spray heads with the various colored inks (for example cyan, magenta and yellow) are arranged in such a way and the relative movement between the spray head and recording support synchronised with the relative movement between the scanning unit and the original in such a way that the various color components of an image element are successively applied to the recording support.

For various reasons, it is of advantage to scan each image element of the original with only a single unit (single-point scanning), and to divide up the color information of each image element into the individual color components using beam dividers, for example dichroic mirrors. In this way, the electronic image signals of the various colour components are made simultaneously available without any need for the image signals to be either delayed or stored beforehand. This simultaneous availability of the various colour signals is necessary to enable colour correction calculations to be carried out for electronic maskings and black separations. In addition, single-point scanning can be carried out more simply and economically and, in overall terms, requires less light for scanning a coloured original.

In known arrangements (for example U.S. Pat. No. 3,553,371), the color signals are delayed with respect to one another after single-point scanning, for example by being magnetically recorded, in order subsequently to control several spray heads arranged one behind the other in the scanning direction in such a way that each image element has its corresponding colored ink components associated with it. Unfortunately, arrangements of this kind for delaying the image signals with respect to one another complicate the recording apparatus and add to its cost, in addition to which the recording heads have to be readjusted relative to one another when the rotating recording drum is changed in the event of a change in scale.

In the case of a recording process in which the ink is transported by entrainment of the ink particles in a channelled air stream (U.S. Pat. No. 2,573,143), it has already been proposed to have the channels carrying the particle streams converge upon one another in such a way that they terminate in a common opening past which the recording support is moved. However, that process is fundamentally different from the ink jet process according to the invention, in which the movement of the droplets of the ink jet used for recording is attributable solely to the impulse imparted to them as they issue from the nozzle. In the process according to the invention, the droplets are completely free-travelling droplets whose movement is not influenced by a mechanically channelling system.

An object of the invention is to provide a multicolor ink recorder for use in an ink-jet recording process, by means of which the individual color components of a coloured image point can be simultaneously applied to a recording support in the form of differently colored ink jets.

The invention provides an ink recorder comprising a recording support; nozzles for producing at least three differently colored ink jets which are directed on to a common point lying in the plane of the recording support; and a control electrode, an extraction system for the ink which is not required for recording, an apertured diaphragm associated with each nozzle, the control electrodes, extraction systems and diaphragms being combined into a block, the control electrodes being electrically insulated with respect to one another and with respect to earth and the nozzles being at electrical earth potential.

The invention makes it possible to arrange several ink units so close to one another that the ink jets from various ink spray nozzles can be simultaneously directed on to a common point in the plane of the recording support. In this connection the diaphragm aperture should be situated as close as possible to the recording point in order as far as possible to prevent deflection by the air stream in the area surrounding the rotating recording drum. The interval between the diaphragm and the recording support should if possible be no more than 3 mm.

When they are not deflected all the ink jets issuing from the various nozzles of the multicolored ink recorder according to the invention are directed on to a common point in the plane of a recording support. A control electrode, an extraction system and an aperture in a diaphragm are associated in known manner with each nozzle. The function of the control electrode is to influence in accordance with information supplied thereto charges in the ink jet issuing from the nozzle and disintegrating into discrete droplets, so that the jet fans out in the form of a cone under the effect of the mutual repulsion of the charged droplets of the jet.

The angle at the apex of the cone, and hence the proportion of the ink jet which is not deflected, is goverened in a predetermined manner by the voltage applied to the control electrode and, hence, by the color signal to be recorded. The function of the extraction system is to arrest, collect and carry off the part of the ink jet which is deflected from its original trajectory. In known spray heads, the extraction system comprises a cylindrical or conical inner wall of a porous liquid-permeable material and a cylindrical outer wall of a solid, non-porous material surrounding the innerwall at a distance therefrom the space between the inner and outer walls being at a reduced pressure which is maintained during operation through connection to a source of vacuum. The porous material may for example, be unglazed ceramic or sintered metal. The diaphragm aperture diameter approximately 0.05 to 0.3 mm allows only a very narrow sector of the cone of ink cone, i.e. only the substantially undeflected portion of the ink jet, through on to the recording support. The ink retained on the diaphragm outside the aperture cannot be used for recording purposes. Accordingly, the diaphragm is best made of the same porous material as the extraction system. If the material in question is an electrically conductive material, for example sintered metal, the control electrode, extraction system and diaphragm may form a functional unit, in which case the extraction system may be designed in such a way that it functions simultaneously as a control electrode and as a diaphragm and concentrically surrounds the non-deflected ink jet. In known single-colour ink recorders, the combination of the control electrode, extraction system and pinhole diaphragm may be made rotationally symmetrical, in which case the inner wall of the extraction system may form a cylindrical channel whose axis coincides with the trajectory of the undeflected part of the ink jet. An annular control electrode and an extraction system arranged concentrically of the diaphragm aperture are mentioned, for example, in German Auslegeschrift No. 1,271,754.

It has surprisingly been found that the rotationally symmetrical arrangement is not in fact essential for the satisfactory functioning of a single-color ink recorder. In the invention, several single-color ink recorders are combined to form a multicolor ink recorder, in which three or more differently colored ink jets are directed on to a common point, so that a rotationally symmetrical arrangement in regard to the individual ink jets is inevitably not present.

In the invention, a plurality, for example three of four, individual combinations of control electrode, extraction system and apertured diaphragm, each associated with an ink jet, are combined into a single block in such a way that the ink jets when undeflected are all directed on to a common point lying in the plane of the recording support. To this end, the nozzles may be at an angle, to one another, for example so that the ink jets lie along generatrices of a cone whose apex is the image point. The nozzles may be symmetrically arranged around this cone so that equal angles are formed between the ink jets issuing from two adjacent nozzles.

According to the invention, the control electrodes have to be electrically insulated both with respect to one another and with respect to earth, so that they can be activated independently of one another, whilst the nozzles and the ink feedlines and ink reservoirs must be at electrical earth potential. This is much easier to achieve than a construction with reversed polarity where the control electrodes are earthed, whilst the nozzles, ink feed lines and reservoirs are insulated with respect to one another and with respect to earth.

The control electrodes may be electrically insulated in different ways. Thus, it is possible to insulate the individual combinations of control electrode, extraction system and apertured diaphragm with respect to one another within the block. To this end, layers of an electrically insulating material, for example rubber, or any other relatively soft, workable plastics material such as polytetrafluoroethylene, may be arranged between the combinations over their contact surfaces. At the same time, these layers seal the various extraction systems off from one another, so that the deflected ink from each individual color unit which is not used for recording is separately collected and may be returned to the particular nozzle.

In cases where the ink spray nozzles are fixedly connected to the associated combination of control electrode, extraction system and diaphragm, it is less suitable to use rubber as a sealing material between the various extraction systems within the block on account of its elasticity, because slight changes in the relative positions of the nozzles and, hence, misalignments of the color separations can occur under the effect of external forces. Ductile materials, such as copper, lead or gold, may be used for sealing off the extraction systems from one another. Since, in this case, due to the electrical conductivity of the sealing materials, the extraction systems are no longer electrically insulated with respect to one another, the control electrodes may be electrically insulated with respect to one another by arranging an electrically insulating material between each electrode and the associated extraction system. For example, the extraction systems may be provided at the inlet for the ink jet with a circular opening into which a control electrode in the form of a ring electrode is fitted by means of an insulating ring. The insulating ring may consist of rubber or any other resilient electrically non-conductive material, and is preferably designed in such a way that, in the event of a discharge along the surface of this insulating ring, the path for the electrical charge is as long as possible. It has proved to be particularly advantageous, to use an insulating ring of rubber with a depending bead.

In cases where it is not desired to recover and re-use ink which is not required for recording, it is possible to simplify the apparatus by combining the various extraction systems to form a common extraction system. In this case, there is no need for seals between the color units. The common extraction system may consist, for example of outer and inner porous extraction cones arranged coaxially and concentrically with respect to one another. Between the two extraction cones there is formed a concially tapering annular space in which the undeflected ink jets travel towards the common recording point parallel to the surfaces formed by the extraction cones. A wall of non-porous material is arranged at a certain distance around the outer extraction cone. In operation, a reduced pressure (100–500 mm water column) is maintained through a connection between the space formed between that wall and the outer extraction cone, to a source of vacuum so that the deflected ink liquid arriving on the outer extraction cone is removed under the suction effect of that reduced pressure. In the same way, the deflected ink arriving on the inner extraction cone is also removed under suction. The inner extraction cone may be for example in the form of a hollow cone of porous material and encloses a space in which a reduced pressure can also be maintained through a second connection to a source of vacuum.

A porous front plate with diaphragms inserted in it may be used to close off the front end of the block formed by the various colour units. The diaphragms bonded to the front plate by sintering or adhesion may either be individually arranged in the front plate or alternatively a common diaphragm support, in the form of a spherical cap, may be arranged on the front plate. The advantage of this particular arrangement is that the diaphragm apertures can be very accurately spaced from one another on the mechanically stable cap. This insures that, providing the jet direction is maintained, all the ink jets meet at the predetermined point on the recording support.

Figure 1:
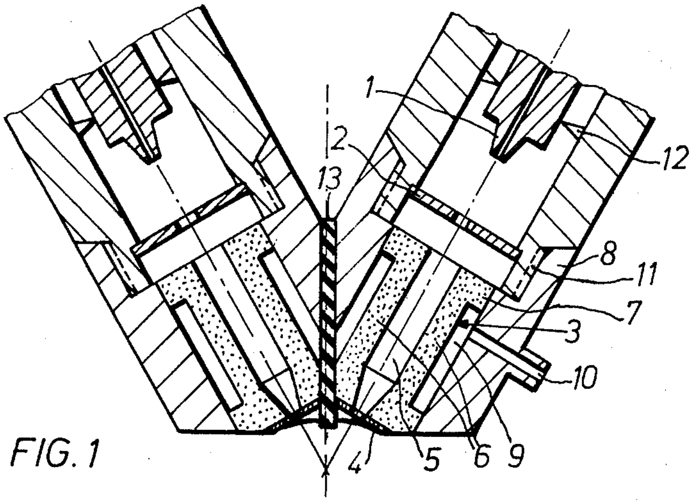
FIGS. 1 and 2 are sections through two different embodiments of the multicolor ink recorder according to the invention taken in plane defined by radial center lines of the embodiments and centerlines of the undeflected ink jets of two adjacent color units within the multicolor ink recorder.

In FIG. 1 each color unit comprises as its essential components an ink spray nozzle 1, an annular control electrode or ring electrode 2, and an extraction system 3 which defines, between the ring electrode 2 and a diaphragm 4, a substantially cylindrical channel 5 which tapers frustoconically in the vicinity of the diaphragm 4 and whose axis coincides with the direction of the undeflected ink jet. The inner wall 6 and the upstream end 7 of the extraction system 3 are of a porous material, whilst the outer wall of the extraction system 3 is formed by the non-porous material of the housing 8. Between the inner wall and the outer wall of the extraction system, there is a space 9 of annular cross-section in which a reduced pressure is maintained through a connection 10 to a source of vaccum. The housing 8 of each color unit is basically in the form of a body of rotation, except for those places at which it contacts the housings of other color units. The housing may consist of an upper section, a lower section and means for establishing a rigid coaxial connection between the upper and lower sections, for example a screw thread 11. The ink spray jet 1 is held by adjusting screws 12 in the upper section of the housing 8. So far as the structure of the individual color units is concerned, reference is made to German Offenlegungsschrift No. 2,350,297, or the corresponding U.S. patent application Ser. No. 510,903, now abandoned.

In the embodiment of the multicolor ink recorder according to the invention illustrated in FIG. 1, a plurality for example three or four, color units of the kind which are described above and of which two are illustrated are in contact with one another at the lower ends of their housing which are correspondingly flattened off in the contact zones. Each color unit forms a sector within the multicolor ink recorder. The color units are sealed off from one another by sealing walls 13 each arranged between two adjacent color units. Each sealing wall 13 may consist of an electrically insulating material, although this is not necessary in cases where the housing or at least its upper section, in which the control electrode is situated, is of an electrically insulating material.

Figure 2:
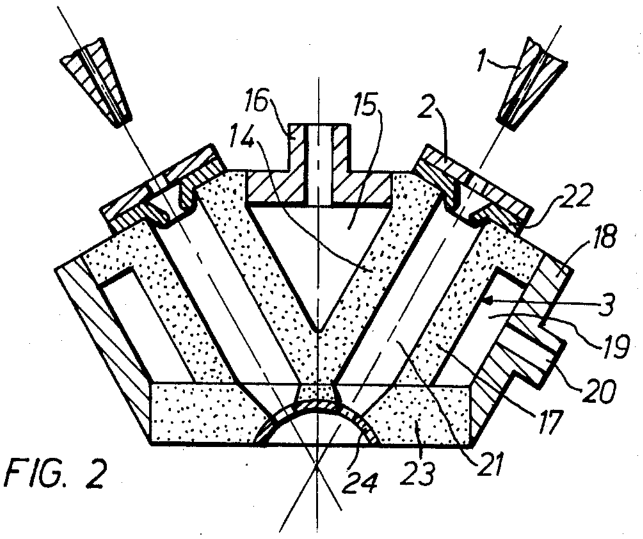
Figure 3:
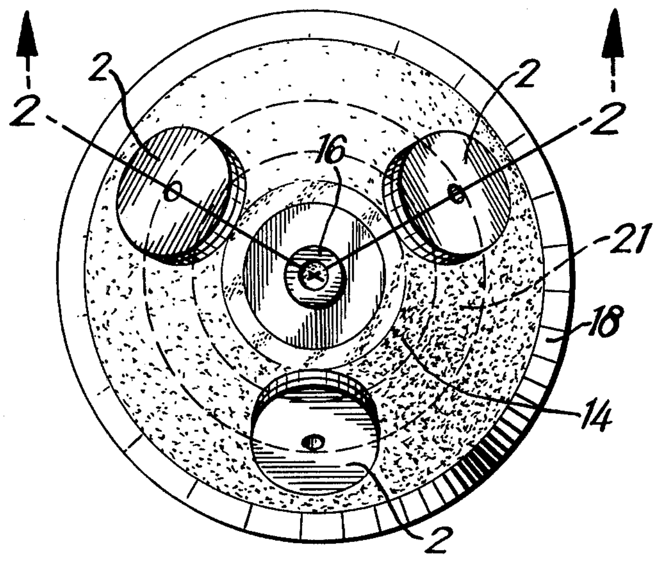
FIG. 3 is a top plan view of the embodiment shown in FIG. 2. A top plan view for FIG. 1 would generally correspond thereto relative to the nozzle configurations and arrangement.

FIG. 2 shows another embodiment of the multicolor ink recorder, in which the ink spray zones are not separated from one another. As in the previous embodiment a nozzle 1, a ring electrode 2 and an opening in a diaphragm are provided for each color unit. Instead of separate extraction systems, however, only one extraction system 3 common to all color units is provided, comprising an inner wall 14 of porous material enclosing a conical space 15 in which a reduced pressure is maintained through a connection 16 to a source of vacuum, and an outer wall 17, also of porous material, which in turn is surrounded by the housing wall 18 consisting of non-porous material. Between the outer porous wall 17 and the housing wall 18 is a space 19 of annular cross-section in which a reduced pressure is maintained through a connection 20 to a source of vacuum. A space 21 between the inner wall 14 and the outer wall 17 also has an annular cross-section and serves as the ink spray zone. The undeflected ink jets travel through the space 21 parallel to the porous walls 14 and 17 towards a common recording point. One of the two connections 16 and 20 may be omitted if connecting webs, also of fine-pored material, are provided between the inner porous wall 14 and the outer wall 17. It has been found that in this way an ink liquid arriving for example on the inner wall 14 can be effectively removed outwards under suction through the connection 20. Naturally the web-like connections must not constitute an obstacle to the non-deflected ink jets.

The space 21 is closed off at the end adjacent the nozzles 1 by a ring-like front wall formed with a circular opening in the vicinity of a respective nozzle. Each of the annular control electrodes 2 is fitted into a respective opening by means of an insulating ring 22 with a depending bead. At the end of the space 21 adjacent the recording support is an annular front plate 23 which may be made of a porous material in order to take up and carry away droplets of ink rebounding and spraying back from the recording support, and into which is inserted a spherical cap diaphragm 24 having openings for the ink jets.

What we claim is:

1. An ink recorder comprising a recording support; nozzles for producing at least three differently colored ink jets which are directed on to a common point lying in the plane of the recording support; and a control electrode for each nozzle, an extraction system for the ink which is not required for recording and an apertured diaphragm associated with each nozzle, the control electrodes, extraction systems and diaphragms being combined into a block, the control electrodes being electrically insulated with respect to one another and with respect to earth and the nozzles being at electrical earth potential, each nozzle and its associated control electrode, extraction system and diaphragm being concentrically disposed about a nozzle centerline, and each nozzle centerline being disposed along the generatrix of a cone whose apex is the common point.

2. An ink recorder as claimed in claim 1, wherein the extraction systems are combined to form a common extraction system within the block, and wherein the control electrodes are electrically insulated from the said common extraction system.

3. An ink recorder as claimed in claim 2 wherein the extraction system includes a conical vacuum chamber disposed between the insides of the centerline of the nozzles.

4. An ink recorder as claimed in claim 2 wherein the extraction system also includes an annular vacuum chamber disposed around the outsides of the centerline of the nozzles.

5. An ink recorder as claimed in claim 1, wherein the extraction systems are sealed off from one another.

6. An ink recorder as claimed in claim 5, wherein the extraction systems are electrically insulated with respect to one another and each have the same electrical potential as the associated control electrode.

7. An ink recorder as claimed in claim 1 wherein the nozzle centerlines are disposed at angles of about 120° relative to each other along the generatrix.

* * * * *